US012724286B2

(12) United States Patent
Zhuang et al.

(10) Patent No.: US 12,724,286 B2
(45) Date of Patent: Sep. 1, 2026

(54) DRIVING MECHANISM

(71) Applicant: Actutek Corporation, Taoyuan City (TW)

(72) Inventors: Po-Xiang Zhuang, Taoyuan City (TW); Wei-Jhe Shen, Taoyuan City (TW); Sin-Jhong Song, Taoyuan City (TW); Shou-Jen Liu, Taoyuan City (TW); Kun-Shih Lin, Taoyuan City (TW); Yi-Ho Chen, Taoyuan City (TW); Chao-Chang Hu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 306 days.

(21) Appl. No.: 18/521,536

(22) Filed: Nov. 28, 2023

(65) Prior Publication Data

US 2024/0176099 A1 May 30, 2024

Related U.S. Application Data

(60) Provisional application No. 63/428,238, filed on Nov. 28, 2022.

(51) Int. Cl.
*G03B 13/36* (2021.01)
*G02B 7/02* (2021.01)
(Continued)

(52) U.S. Cl.
CPC ............. *G02B 27/646* (2013.01); *G02B 7/02* (2013.01); *G02B 7/08* (2013.01); *G02B 7/09* (2013.01);
(Continued)

(58) Field of Classification Search
CPC .......... G02B 27/646; G02B 7/08; G02B 7/09; G02B 27/64; G02B 7/02; G03B 13/36; G03B 3/10; G03B 5/00; G03B 13/34; H04N 23/67; H04N 23/68; H04N 23/50; H04N 23/51; H04N 23/57; H02K 33/00; H02K 33/18
(Continued)

(56) References Cited

U.S. PATENT DOCUMENTS 11,287,725 B2 * 3/2022 Weng ..................... H02K 33/18
11,619,799 B2 * 4/2023 Lin ........................... G01L 1/16
348/373
(Continued)

FOREIGN PATENT DOCUMENTS

CN 114114590 A 3/2022
CN 114624845 A * 6/2022 ............. H04N 23/55
KR 20190044595 A * 4/2019 ............. H02K 33/18

OTHER PUBLICATIONS

Chinese Office Action issued on May 15, 2024 for the corresponding Application No. 202323240556.1; pp. 1-2.

*Primary Examiner* — George G. King
*Assistant Examiner* — Natasha Nigam
(74) *Attorney, Agent, or Firm* — MUNCY, GEISSLER, OLDS & LOWE, P.C.

(57) ABSTRACT

A driving mechanism for moving an optical element is provided, including a fixed part, a movable part, and a driving assembly. The movable part is movably connected to the fixed part, wherein the optical element is disposed on the movable part. The driving assembly is configured to drive the movable part to move relative to the fixed part.

15 Claims, 10 Drawing Sheets

(51) Int. Cl.

| | |
|---|---|
| ***G02B 7/08*** | (2021.01) |
| ***G02B 7/09*** | (2021.01) |
| ***G02B 27/64*** | (2006.01) |
| ***G03B 3/10*** | (2021.01) |
| ***G03B 13/34*** | (2021.01) |
| ***G03B 30/00*** | (2021.01) |
| ***H02K 33/00*** | (2006.01) |
| ***H02K 33/18*** | (2006.01) |

(52) U.S. Cl.
CPC ............... *G02B 27/64* (2013.01); *G03B 3/10* (2013.01); *G03B 13/34* (2013.01); *G03B 13/36* (2013.01); *G03B 30/00* (2021.01); *H02K 33/00* (2013.01); *H02K 33/18* (2013.01)

(58) Field of Classification Search
USPC .......................................................... 396/341
See application file for complete search history.

(56) References Cited

U.S. PATENT DOCUMENTS

| | | | | |
|---|---|---|---|---|
| 12,032,224 | B2 * | 7/2024 | Lin | G02B 7/09 |
| 12,181,631 | B2 * | 12/2024 | Hu | H04N 23/57 |
| 12,210,208 | B2 * | 1/2025 | Chang | G02B 7/08 |
| 12,501,136 | B2 * | 12/2025 | Wang | G03B 3/10 |
| 2020/0213493 | A1 * | 7/2020 | Cheng | H04N 23/54 |
| 2021/0029274 | A1 * | 1/2021 | Weng | H04N 23/50 |
| 2022/0210296 | A1 * | 6/2022 | Bang | G03B 13/36 |
| 2022/0221685 | A1 * | 7/2022 | Shen | H01F 7/081 |
| 2023/0132120 | A1 * | 4/2023 | Chen | G02B 7/04<br>335/220 |
| 2023/0336860 | A1 * | 10/2023 | Chang | G03B 30/00 |
| 2024/0019760 | A1 * | 1/2024 | Chao | G02B 27/646 |
| 2024/0142858 | A1 * | 5/2024 | Wu | G02B 13/0065 |
| 2024/0248280 | A1 * | 7/2024 | Zhuang | G02B 7/08 |
| 2024/0264405 | A1 * | 8/2024 | Hu | G02B 7/08 |
| 2024/0295745 | A1 * | 9/2024 | Wu | G02B 27/646 |
| 2024/0337907 | A1 * | 10/2024 | Wang | G03B 7/26 |
| 2024/0369909 | A1 * | 11/2024 | Hsieh | G03B 9/06 |
| 2024/0402457 | A1 * | 12/2024 | Chao | G02B 7/08 |
| 2024/0411126 | A1 * | 12/2024 | Chen | G03B 3/10 |
| 2025/0020972 | A1 * | 1/2025 | Chien | G03B 3/10 |
| 2025/0028150 | A1 * | 1/2025 | Wu | G02B 13/001 |
| 2025/0044546 | A1 * | 2/2025 | Hu | G02B 7/08 |
| 2025/0102880 | A1 * | 3/2025 | Wang | G02B 5/005 |
| 2025/0116799 | A1 * | 4/2025 | Chao | G02B 5/005 |
| 2025/0147265 | A1 * | 5/2025 | Chao | G02B 7/04 |
| 2025/0147267 | A1 * | 5/2025 | Fan | G02B 7/08 |
| 2025/0147268 | A1 * | 5/2025 | Chen | G02B 7/09 |
| 2025/0147269 | A1 * | 5/2025 | Shen | G02B 7/09 |
| 2025/0155782 | A1 * | 5/2025 | Fan | G02B 13/001 |
| 2025/0180858 | A1 * | 6/2025 | Zhuang | G02B 7/09 |
| 2025/0231371 | A1 * | 7/2025 | Chang | G02B 27/646 |

* cited by examiner

DRIVING MECHANISM

CROSS REFERENCE TO RELATED APPLICATIONS

This application claims the benefit of U.S. Provisional Application No. 63/428,238, filed Nov. 28, 2022, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, the optical lens module may have a lot of components such as coils and magnets for adjusting the focus of a lens. However, miniaturization of the electronic devices may increase the difficulty of mechanical design, and it may also lead to low reliability and a low driving force for moving the lens. Therefore, addressing the aforementioned problems has become a challenge.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part, wherein the optical element is disposed on the movable part and has an optical axis. The driving assembly is configured to drive the movable part to move relative to the fixed part.

In some embodiments, the driving mechanism further includes a frame, wherein the fixed part has a base and a housing connected to each other, the frame is affixed in the housing, and the movable part is received in the frame, wherein when the movable part moves relative to the fixed part along the optical axis to a limit position, the movable part contacts the frame to prevent from collision with the housing.

In some embodiments, the frame has a top portion and a plurality of extending portions extending from the top portion toward the base, and when the movable part moves relative to the fixed part to the limit position along the optical axis, the movable part contacts the top portion of the frame.

In some embodiments, the driving assembly includes a coil disposed on the movable part and a magnetic element disposed between the extending portions.

In some embodiments, the driving mechanism further includes a first circuit board and at least a first conductive member, the first circuit board is disposed on the frame, and the first conductive member is embedded in the top portion of the frame and electrically connected to the first circuit board.

In some embodiments, the driving mechanism further includes a magnet and a magnetic field sensor, the magnet is disposed on the movable part, and the magnetic field sensor is disposed on the first circuit board for detecting the position of the magnet.

In some embodiments, the driving mechanism further includes a second circuit board disposed on the frame, wherein the first and second circuit boards are disposed on opposite sides of the frame, the first conductive member is embedded in the top portion of the frame and electrically connected to the first and second circuit boards.

In some embodiments, the driving mechanism further includes a temperature sensor disposed on the second circuit board.

In some embodiments, the driving mechanism further includes a plurality of first conductive members extending downward on opposite sides of the second circuit board and protruding from the base.

In some embodiments, the temperature sensor faces the housing.

In some embodiments, the magnetic field sensor and the temperature sensor face the same direction.

In some embodiments, the driving assembly include a coil and a magnetic element, and the frame is shaped in an octagon that includes a long side and a short side adjacent to each other, wherein the coil is disposed on the movable part, and the magnetic element is disposed on the long side of the frame.

In some embodiments, the long side of the frame is 2 to 20 times of the short side.

In some embodiments, the driving mechanism further includes a rod affixed to the base and in contact with the movable part, wherein the movable part is slidable along the rod relative to the fixed part, and the rod is located adjacent to the short side of the frame and spaced away from the first circuit board.

In some embodiments, the coil has a central axis offset from the optical axis in a horizontal direction that is perpendicular to the optical axis.

In some embodiments, the driving mechanism further includes a second conductive member embedded in the base and electrically connected to the first conductive member.

In some embodiments, the driving mechanism further includes a rod, wherein the base has a column affixed to the rod, and the rod contacts the movable part.

In some embodiments, the driving mechanism further includes a plurality of wires, wherein the driving assembly includes a plurality of coils and magnetic elements, the movable part has two bobbins, the wires connect the coils to the bobbins, and the column is higher than the bobbins on the top side of the movable part.

In some embodiments, the movable part has a contact portion in contact with the rod, the column and the contact portion are located between the two bobbins, and the contact portion is slidable along the rod.

In some embodiments, the housing has an opening, and the frame has a hole that is larger than the opening, wherein the optical axis passes through the opening and the hole.

In some embodiments, the driving mechanism further includes an upper spring sheet, and the driving assembly includes a plurality of coils and magnetic elements, wherein the upper spring sheet and the coils are disposed on the movable part, the magnetic elements are disposed on the frame, and the coils are electrically connected by the upper spring sheet.

In some embodiments, the driving mechanism further includes a plurality of upper spring sheets, a lower spring sheet and a metal sheet, wherein the driving assembly includes a plurality of coils and magnetic elements, the upper spring sheet and the coils are disposed on the movable part, the magnetic elements are disposed on the frame, and the coils are electrically connected by the upper spring sheets and the metal sheet, wherein the metal sheet extends from the top side of the movable part to the bottom side of the movable part to electrically connect to the lower spring sheet.

BRIEF DESCRIPTION OF THE DRAWINGS

The present invention can be more fully understood by reading the subsequent detailed description and examples with references made to the accompanying drawings, wherein:

FIGS. 3 and 4 are perspective diagrams of the driving mechanism 100 in FIGS. 1 and 2 after assembly.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
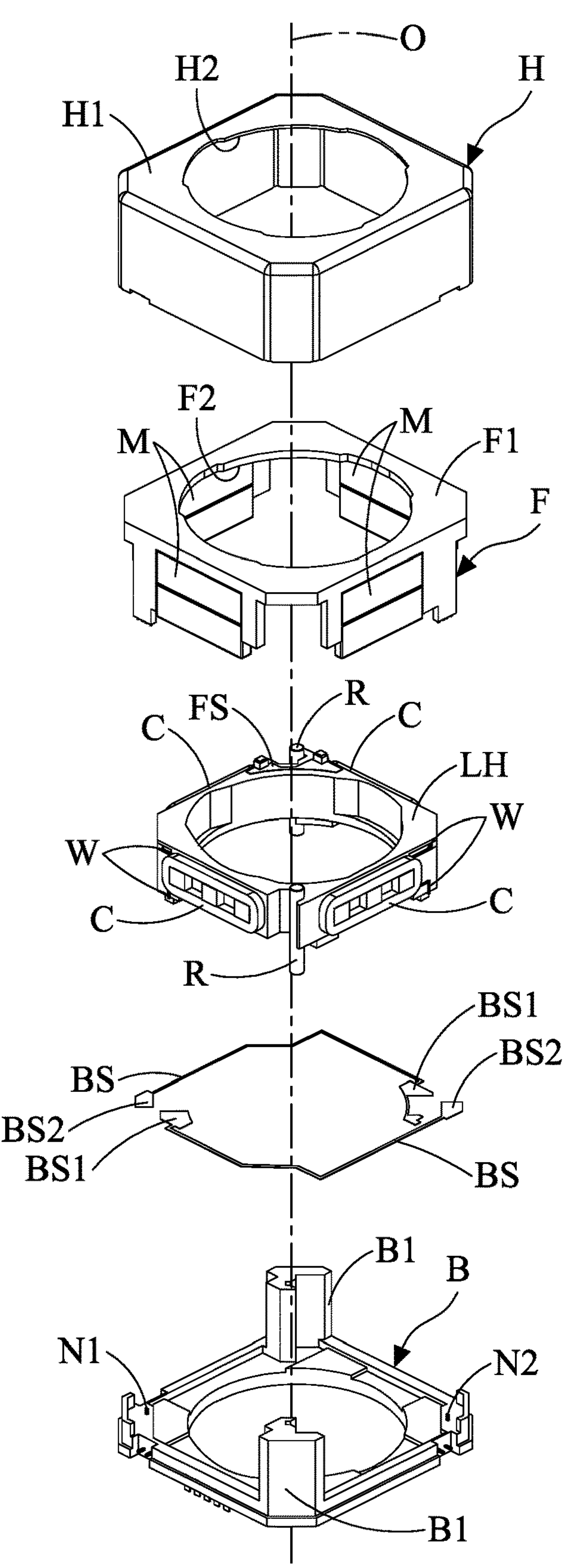
FIGS. 1 and 2 are exploded diagrams of a driving mechanism 100 in accordance with an embodiment of the invention.
Figure 2:
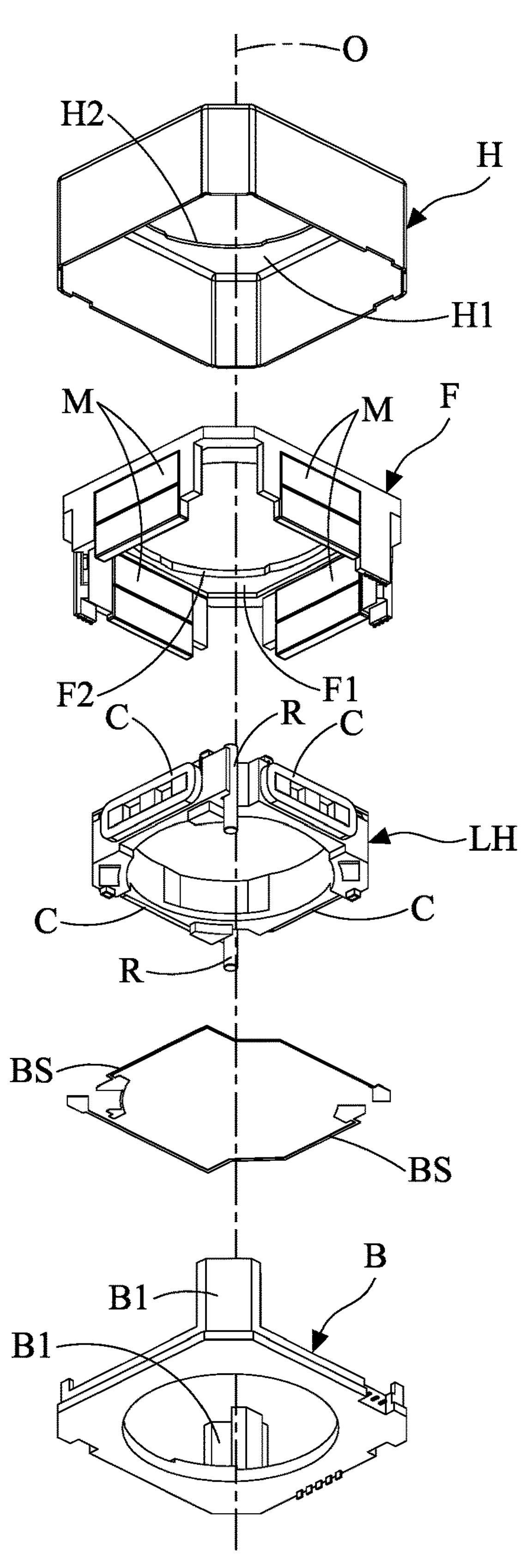
Figure 2:
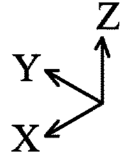
Figures 3, 4:
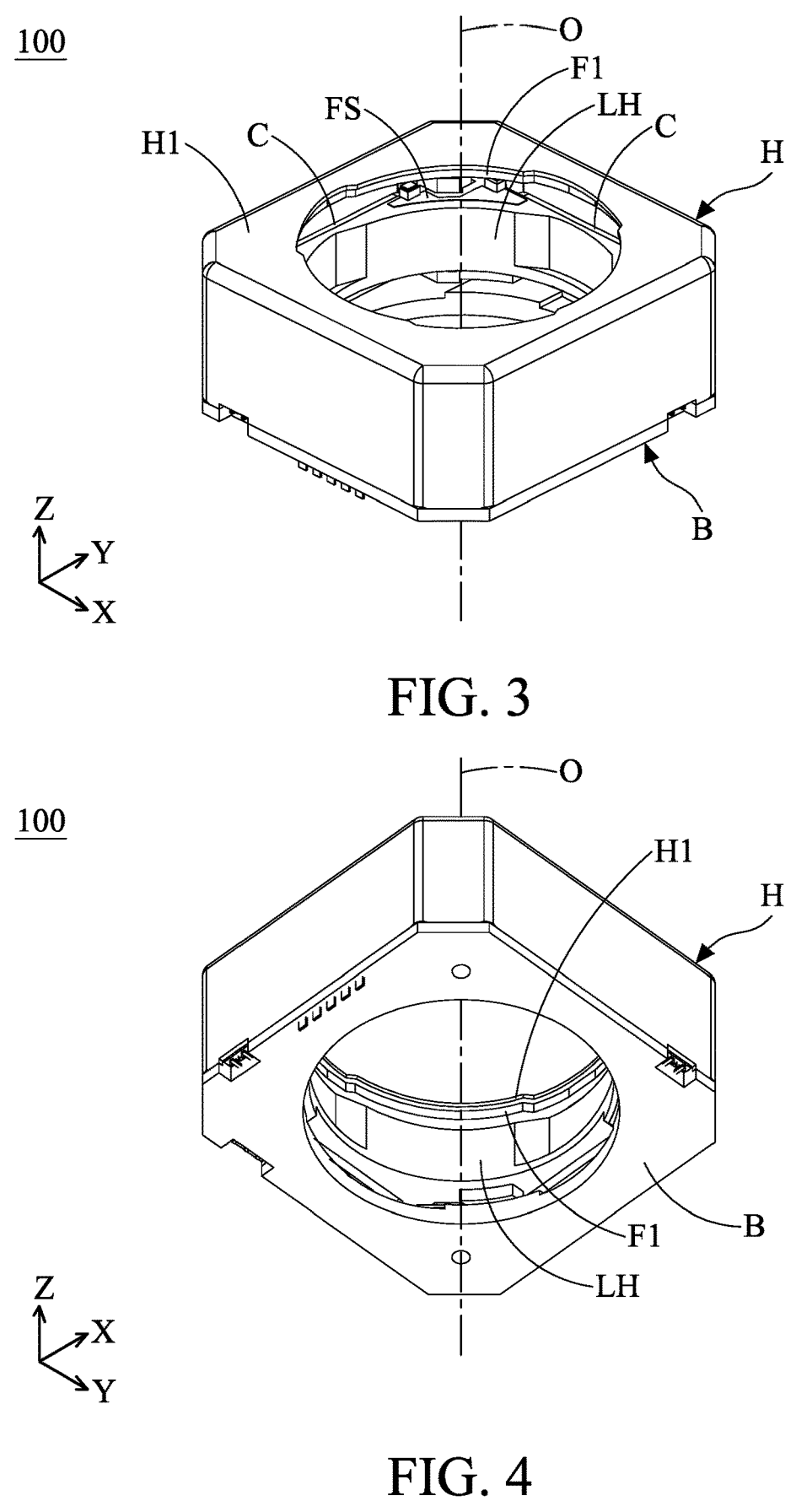

FIGS. 1 and 2 are exploded diagrams of a driving mechanism 100 in accordance with an embodiment of the invention. FIGS. 3 and 4 are perspective diagrams of the driving mechanism 100 in FIGS. 1 and 2 after assembly.

Referring to FIGS. 1-4, the driving mechanism 100 is a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

The driving mechanism 100 primarily comprises a metal housing H, a base B, a frame F, a holder LH, an upper spring sheet FS, at least one lower spring sheet BS, at least one magnetic element M, and at least one coil C. In this embodiment, the housing His affixed to the base B, thus forming a fixed part of the driving mechanism 100. The frame F comprises plastic material and is affixed on the inner side of the housing H.

The housing H has a top cover H1 and an opening H2 formed at on the top cover H1. The frame F has a top portion F1 that forms a hole F2. The top portion F1 of the frame F can be adhered to the inner side of the top cover H1 by the glue. The optical axis O of the optical element passes through the opening H2 and the hole F2, wherein the hole F2 is larger than the opening H2.

Additionally, the holder LH comprises plastic material and is movably received in the frame F. The holder LH constitutes a movable part of the driving mechanism 100 for holding the optical element (not shown).

In this embodiment, the holder LH and the base B are movably connected to each other via the lower spring sheets BS which are electrically connected to the conductive members N1 and N2 exposed on the top surface of the base B.

Two rods R are affixed to the columns B1 of the base B, wherein each rod R is connected between the column B1 and the holder LH. Specifically, the holder LH and the optical element received in the holder LH can slide along the rods R relative to the base B and the housing H along the Z axis.

With the configuration as described above, external light can enter the driving mechanism 100 substantially along the optical axis O (Z axis) of the optical element, and light can propagate through the optical element to an image sensor (not shown) below the base B to form a digital image.

Four coils C are disposed on four sides of the holder LH, and correspondingly, four magnetic elements M (e.g. magnets) are disposed on four sides of the frame F. The coils C and the magnetic elements M constitute a driving assembly of the driving mechanism 100 for impelling the holder LH and the optical element received in the holder LH relative to the base B and the housing H along the Z axis.

In FIG. 1, several wires W and an upper spring sheet FS are disposed on the holder LH and electrically connected to the coils C. Two of the wires W are electrically connected to the lower spring sheets BS on the bottom side of the holder LH, whereby electrical signals can be transferred through the lower spring sheets BS, and the conductive members N1 and N2 to an external circuit.

When a current signal is applied to the coils C, an electromagnetic force can be generated by the coils C and the magnetic elements M, so that the holder LH and the optical element received therein are driven to move relative to the base B and the housing H along the optical axis O (Z axis) for auto-focusing (AF) or Optical Image Stabilization (OIS).

Figure 5:
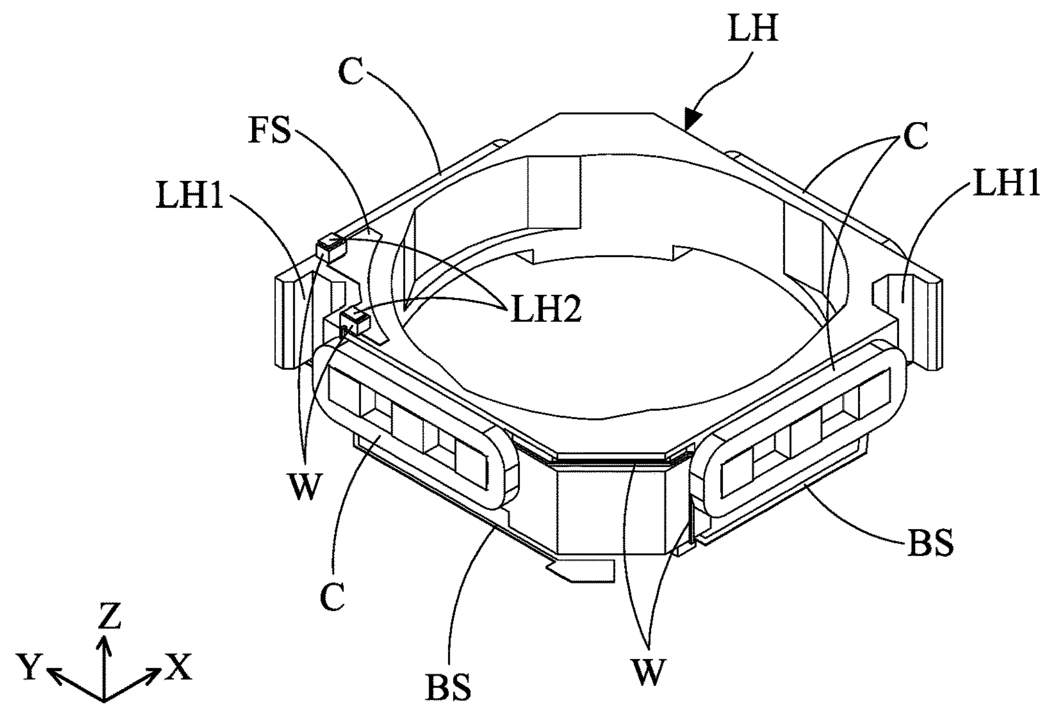
FIG. 5 is a perspective diagram showing the wires W electrically connected to the coils C, wherein the upper spring sheet FS electrically connected to the two wires W wound on the bobbins LH2.
Figure 6:
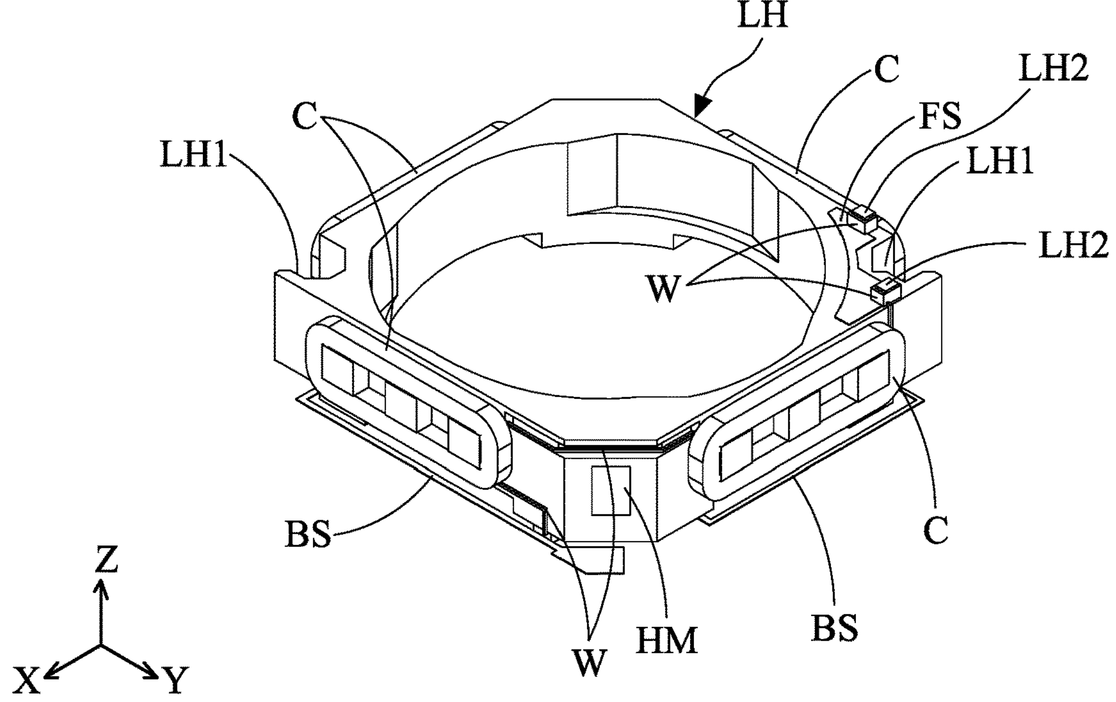
FIG. 6 is another perspective diagram showing several wires W electrically connected to the coils C, wherein the upper spring sheet FS is electrically connected to the two wires W wound on the bobbins LH2.
Figure 7:
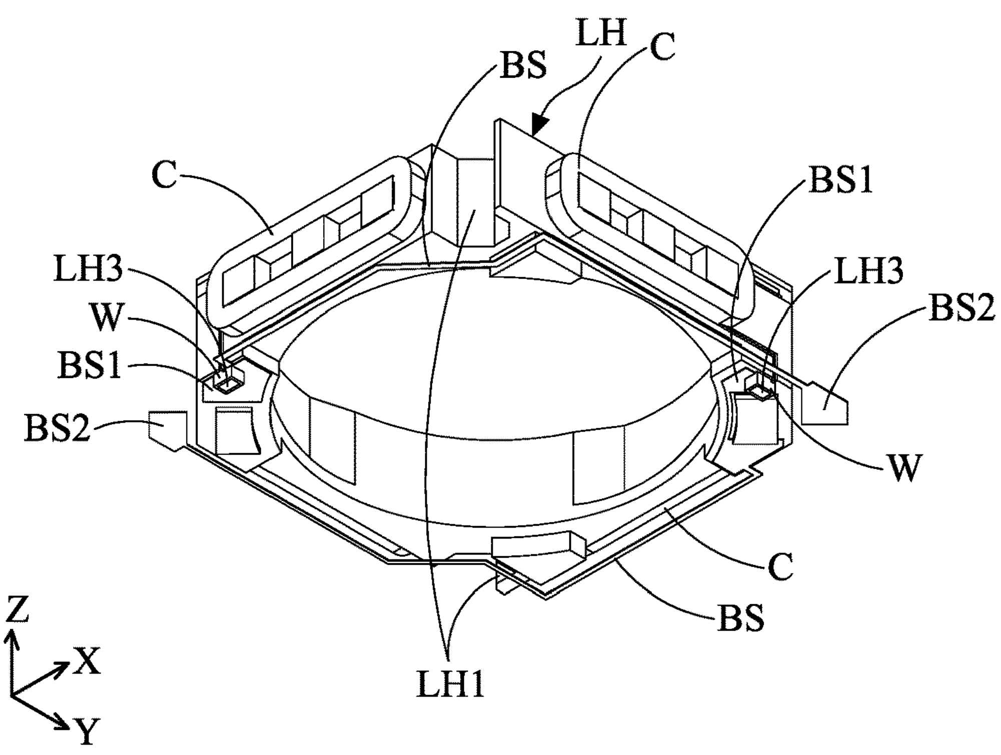
FIG. 7 is a perspective diagram showing the first ends BS1 of the two lower spring sheets BS located adjacent to the wires W wound on the bobbins LH3.

FIG. 5 is a perspective diagram showing the wires W electrically connected to the coils C, wherein the upper spring sheet FS electrically connected to the two wires W wound on the bobbins LH2. FIG. 6 is another perspective diagram showing several wires W electrically connected to the coils C, wherein the upper spring sheet FS is electrically connected to the two wires W wound on the bobbins LH2. FIG. 7 is a perspective diagram showing the first ends BS1 of the two lower spring sheets BS located adjacent to the wires W wound on the bobbins LH3.

Referring to FIGS. 5-6, the coils C on the holder LH can be electrically connected in serial by the wires W and the upper spring sheet FS, wherein the two wires W wound on the bobbins LH2 are electrically connected via the upper spring sheet FS.

Specifically, the two bobbins LH2 extend upward from the top side of the holder LH, and they are located at a corner of the holder LH where two adjacent coils C are connected to each other. The two coils C connect to the other coils C via the wires W which extend horizontally through another two corners of the holder LH. In FIG. 6, a magnet HM is disposed at a corner of the holder LH where a wire W passes to connect two of the coils C. It should be noted that no wire W passes through the corner of the holder LH that is on the diagonal side and opposite to the two bobbins LH2 with respect to the optical axis O.

As shown in FIG. 7, two of the wires W extend from the coils W to the bobbins LH3 on the bottom side of the holder LH. Here, each of the lower spring sheets BS has a first end BS1 and a second end BS2. The first ends BS1 of the lower spring sheets BS are affixed to the bottom of the holder LH and electrically connected to the wires W wound on the bobbins LH3 by soldering or welding. The second ends BS2 of the lower spring sheets BS are affixed to base B and electrically connected to the conductive members N1 and N2. Thus, the coils C can electrically connect to the external circuit via the wires W, the lower spring sheets BS, and the conductive members N1 and N2.

It should be noted that the first end BS1 of one lower spring sheet BS and the second end BS2 of the other lower spring sheet BS are located at the same corner of the holder LH where a wire W passes to connect two of the coils C. Specifically, the distance from the optical axis O to the second ends BS2 of the lower spring sheets BS is greater than the distance from the optical axis O to the first ends BS1 of the lower spring sheets BS.

Figure 8:
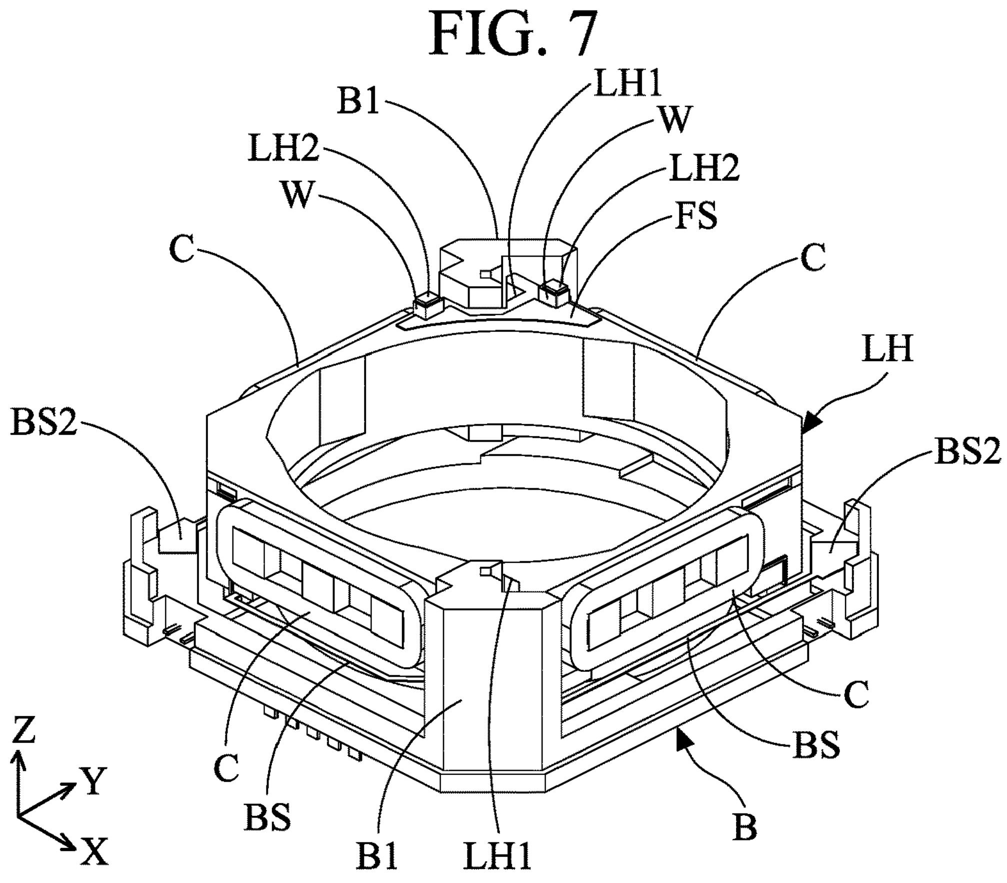
FIG. 8 is a perspective diagram showing the second ends BS2 of the lower spring sheets BS affixed to the base B.

FIG. 8 is a perspective diagram showing the second ends BS2 of the lower spring sheets BS affixed to the base B.

Referring to FIGS. 1 and 8, the second ends BS2 of the lower spring sheets BS are affixed to the base B and electrically connected to the conductive members N1 and N2. Moreover, as shown in FIGS. 5-8, the holder LH has two contact portions LH1 located at two corners thereof. The rods R are connected between the contact portions LH1 of the holder LH and the columns B1 of the base B. Specifically, the column B1 and the contact portions LH1 are located between the two bobbins LH2, and the column B1 is higher than the bobbins LH2 in the Z direction (FIG. 8).

In this embodiment, the rods R are adhered to the columns B1 of the base B by the glue. When the holder LH is driven to move relative to the base B and the housing H along the optical axis O (Z axis), the contact portions LH1 of the holder LH can slide along the rods R.

Figure 9:
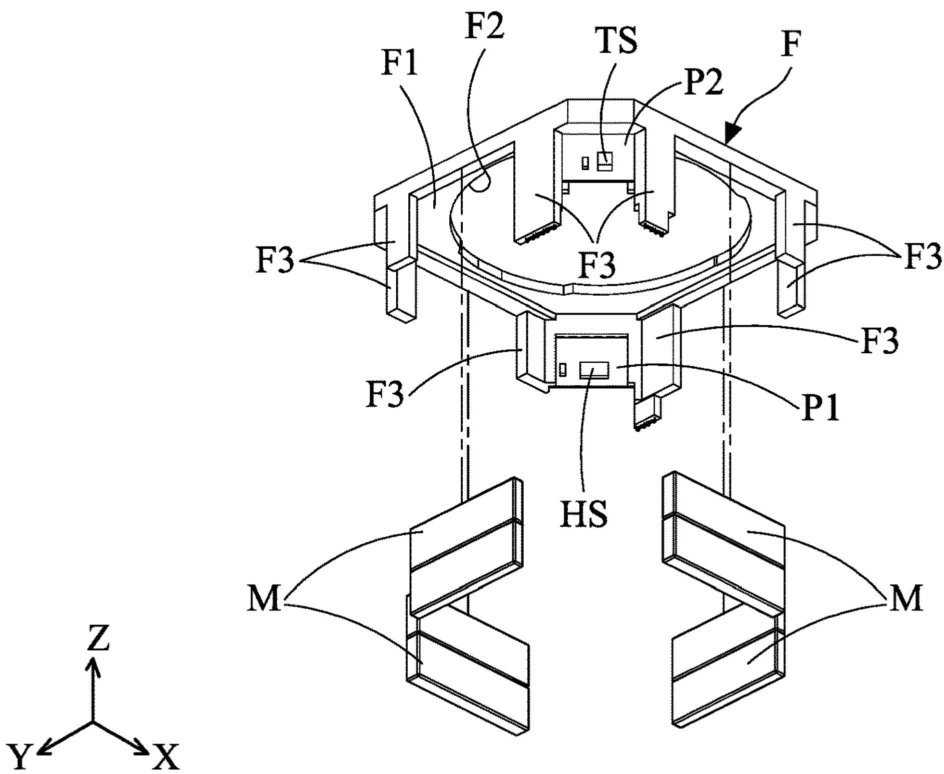
FIG. 9 is an exploded diagram of the magnetic elements M and the frame F before assembly.
Figure 10:
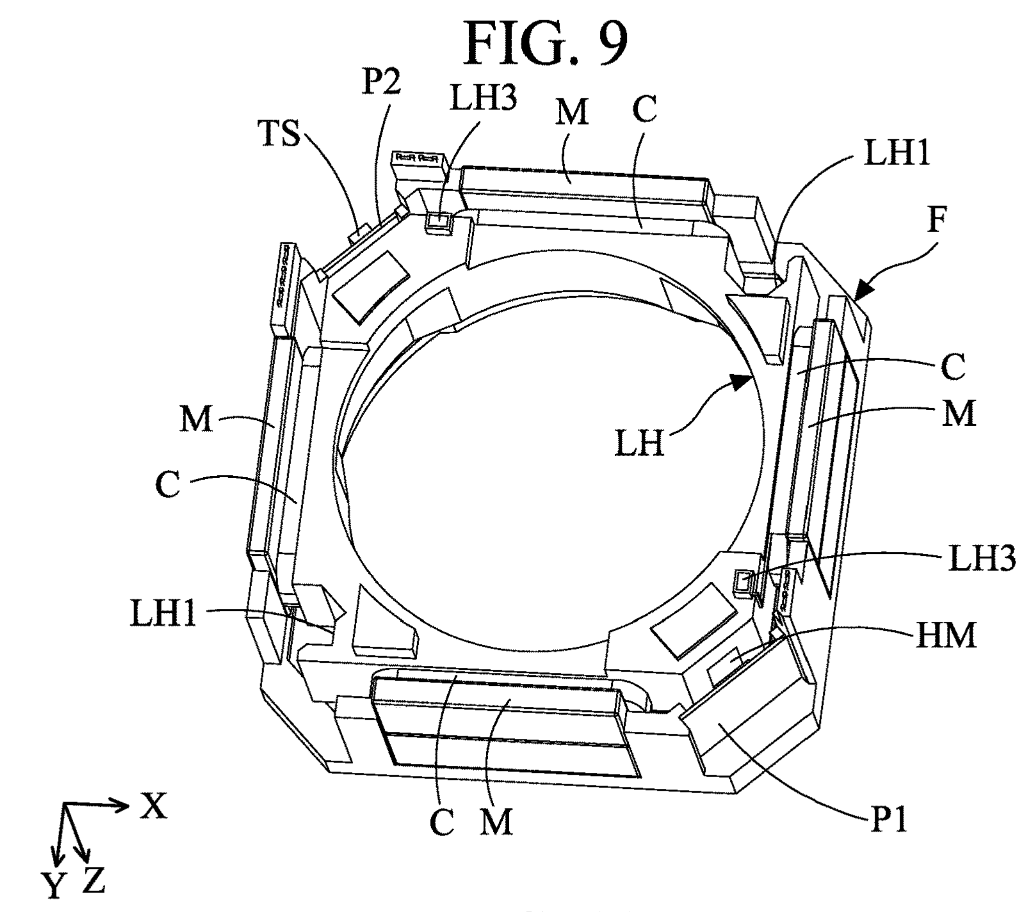
FIG. 10 is a perspective diagram showing the holder LH received in the frame F.

FIG. 9 is an exploded diagram of the magnetic elements M and the frame F before assembly. FIG. 10 is a perspective diagram showing the holder LH received in the frame F.

Referring to FIG. 9, the frame F has a top portion F1 facing the −Z direction the and several extending portions F3 extending from the top portion F1 in the −Z direction. The magnetic elements M are not located at the corners of the frame F, and they are affixed between the adjacent extending portions F3. Each column B1 of the base B is affixed between the adjacent extending portions F3 which are located adjacent to the corner of the frame F. During assembly, the columns B1 of the base B and the extending portions F3 of the frame F can be adhered to each other by the glue, thus enhancing the structural strength of the driving mechanism 100.

Moreover, a first circuit board P1 and a second circuit board P2 are disposed on opposite diagonal sides of the frame F, wherein a magnetic field sensor HS is disposed on the first circuit board P1, and a temperature sensor TS is disposed on the second circuit board P2. Here, the magnetic field sensor HS is located corresponding to the magnet HM.

For example, the magnetic field sensor HS may be a Hall effect sensor, MR sensor, or Fluxgate sensor to detect the position variation of the magnet HM, so that the relative movement between the movable part (holder LH) and the movable part (the base B and the housing H) along the Z axis can be determined promptly.

It should be noted that the magnetic field sensor HS faces the magnet HM after assembly, and the temperature sensor TS faces the housing H to detect the temperature of the environment. In this embodiment, the housing H has a high thermal conductive coefficient, thus enabling precise sensing the temperature sensor TS.

In this embodiment, when the holder LH and the optical element received therein are driven to move relative to the base B and the housing H in the Z direction to a limit position, the holder LH contacts the top portion F1 of the frame F. That is, the holder LH and the top portion F1 of the frame F at least partially overlap along the optical axis O (Z direction), whereby the housing H can be prevented from being impacted by the holder LH.

Figure 11:
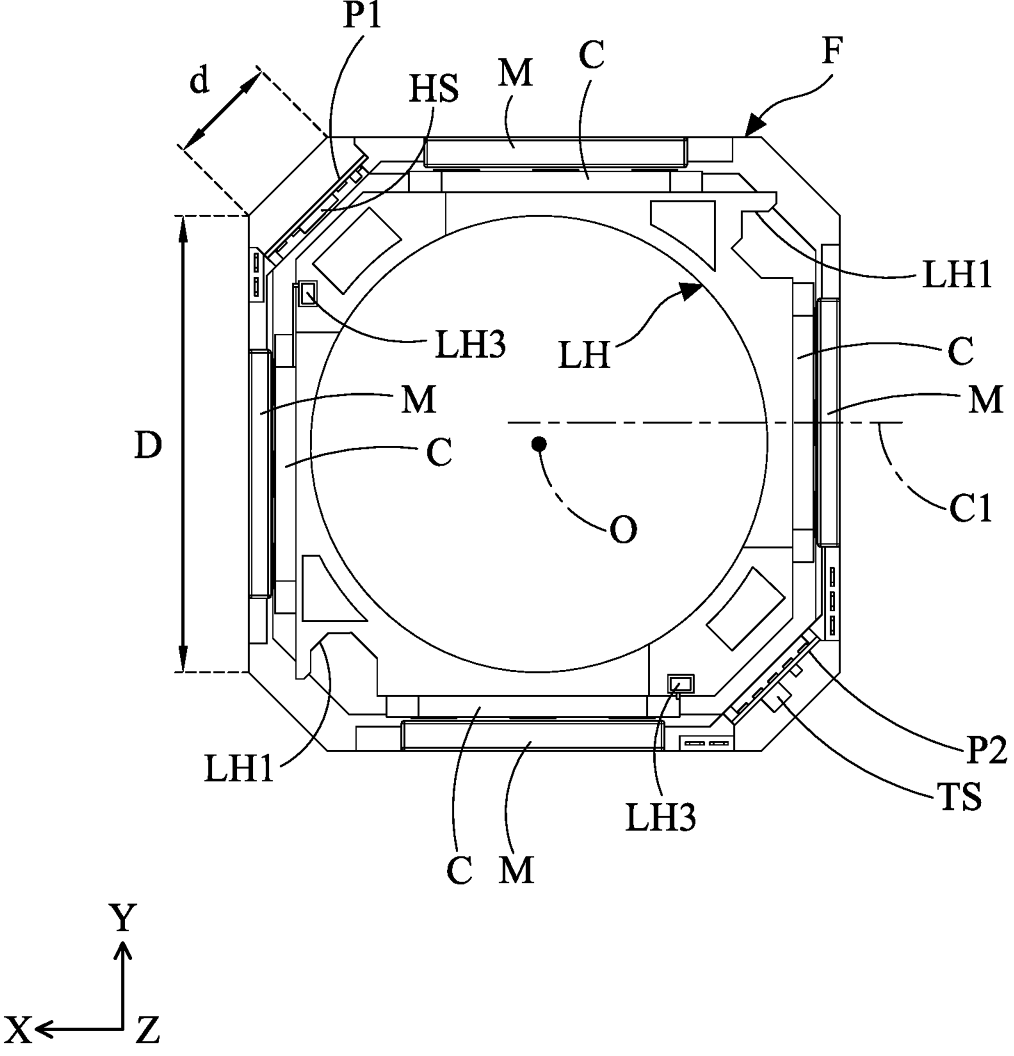
FIG. 11 is a top view of the magnetic elements M, the coils C, the holder LH, and the frame F after assembly.

FIG. 11 is a top view of the magnetic elements M, the coils C, the holder LH, and the frame F after assembly.

Referring to FIG. 11, the housing H, the holder LH, and the frame F have an octagonal structure. The frame F has four long sides and four short sides, wherein the long sides are longer than the short sides, and the central axis C1 of at least one coil C is offset from the optical axis O in a horizontal direction (X or Y axis) that is perpendicular to the optical axis O. In this embodiment, the width D of the long sides is 2-20 times (preferably 5-10 times) of the width d of the short sides, but the invention is not limited to the embodiments.

As shown in FIGS. 1, 2, 9, 10, and 11, the magnetic elements M are disposed on the long sides of the frame F, and the first and second circuit boards P1 and P2 are disposed on two short sides of the frame F.

Specifically, the first and second circuit boards P1 and P2 are located on two diagonal short sides of the frame F with respect to the optical axis O. Moreover, the contact portions LH1, the columns B1 and the rods R between the contact portions LH1 and the columns B1 are located close to the other two diagonal short sides of the frame F with respect to the optical axis O, and they are spaced apart from the first and second circuit boards P1 and P2.

Figure 12:
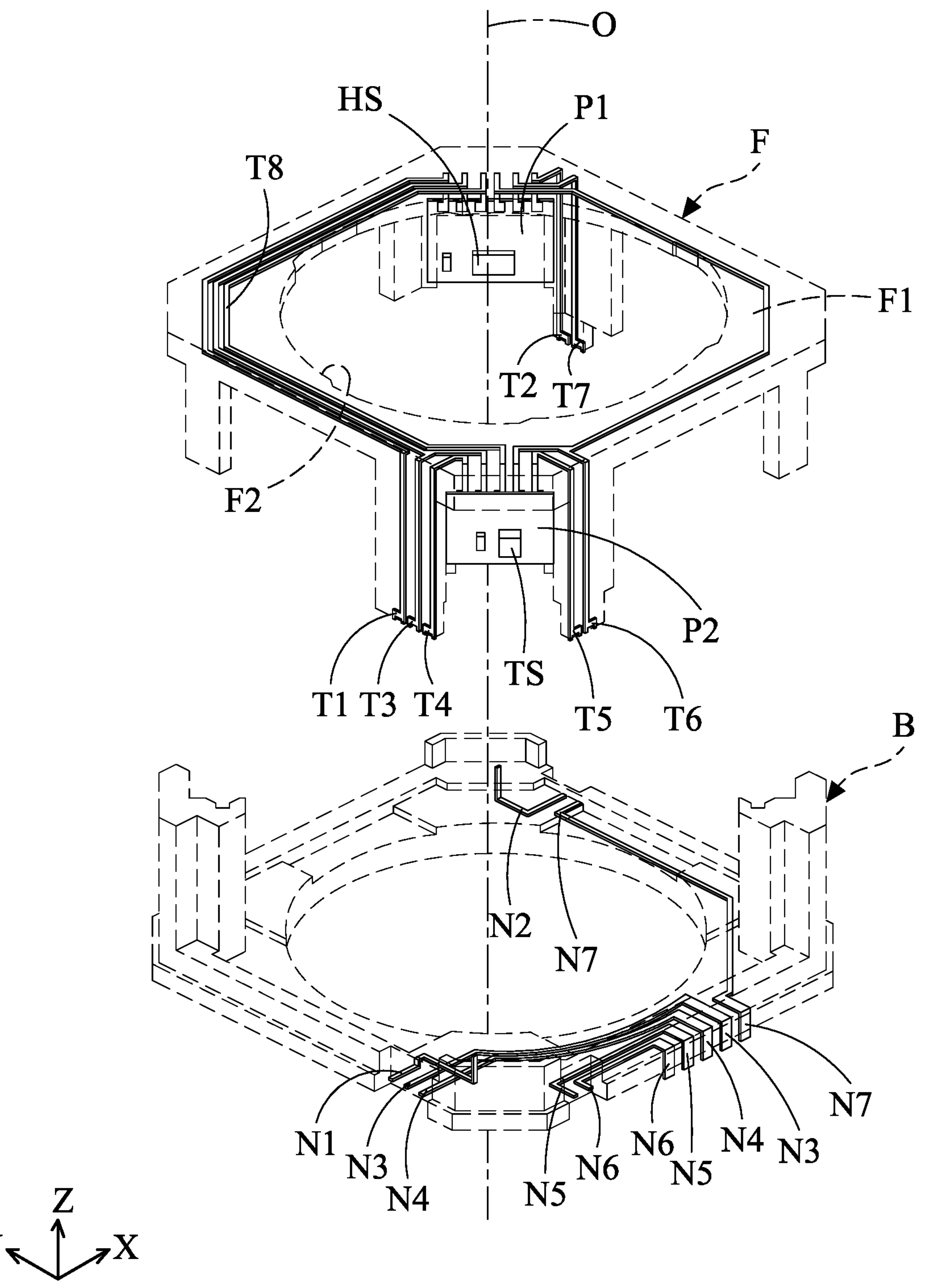
FIG. 12 is a schematic diagram showing several conductive members embedded in the frame F and the base B.
Figure 13:
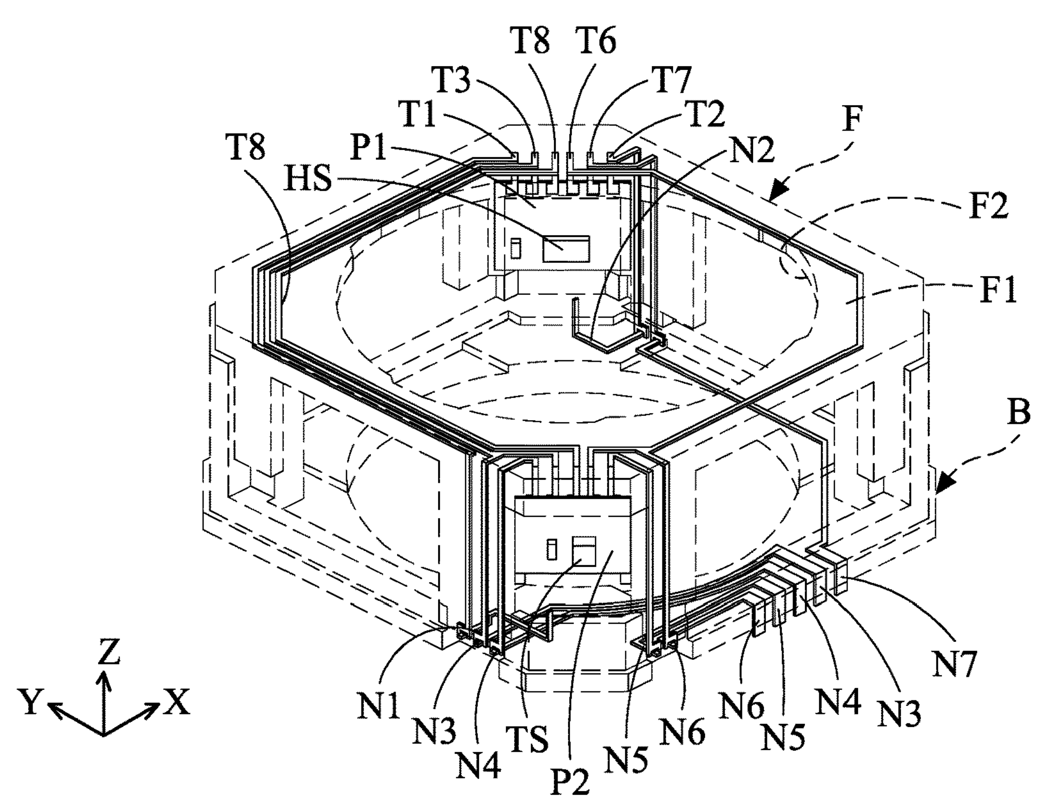
FIG. 13 is a schematic diagram showing the frame F and the base B in FIG. 12 after assembly.
Figure 14:
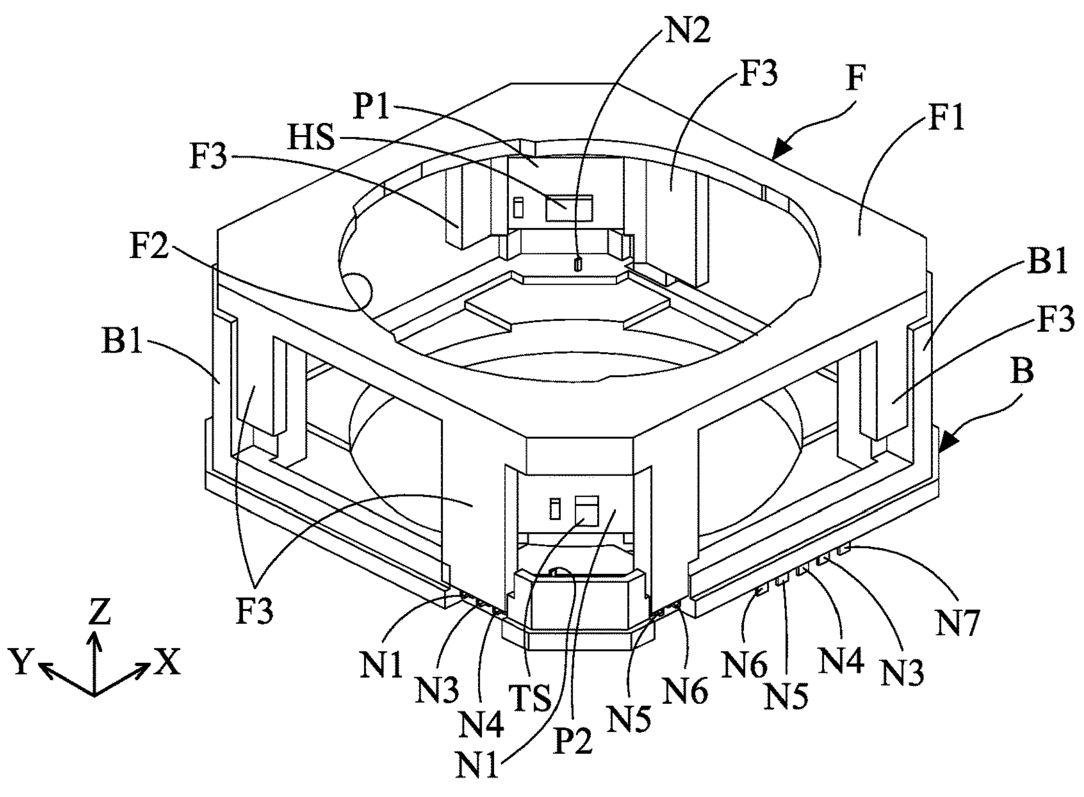
FIG. 14 is a perspective diagram showing the second conductive members N1 and N2 protruding from the top surface of the base B, wherein the magnetic field sensor HS on the first circuit board P1 and the temperature sensor TS on the second circuit board P2 face the same direction.

FIG. 12 is a schematic diagram showing several conductive members embedded in the frame F and the base B. FIG. 13 is a schematic diagram showing the frame F and the base B in FIG. 12 after assembly. FIG. 14 is a perspective diagram showing the second conductive members N1 and N2 protruding from the top surface of the base B, wherein the magnetic field sensor HS on the first circuit board P1 and the temperature sensor TS on the second circuit board P2 face the same direction.

As shown in FIGS. 11-14, a plurality of first conductive members T1-T8 are embedded in the frame F, and a plurality of second conductive members N1-N7 are embedded in the base B. In this embodiment, The first conductive members T1-T7 are electrically connected to the second conductive members N1-N7 by soldering or welding.

Specifically, the first conductive member T8 connects the first circuit board P1 to the second circuit board P2, but does not connect to the second conductive members N1-N7. The ends of the second conductive members N3-N7 protrude from the bottom surface of the base B and are arranged on a long side of the frame F that is adjacent to the second circuit board P2.

In this embodiment, the second conductive members N1 and N2 protrude from the top surface of the base B (FIG. 14), and the magnetic field sensor HS on the first circuit board P1 and the temperature sensor TS on the second circuit board P2 face the same direction.

The first conductive members T3, T6, and T8 extend through the top portion F1 of the frame F to directly connect the first circuit board P1 to the second circuit board P2 on the opposite diagonal sides of the frame F. Specifically, the first conductive members T3 and T6 extend downward on the opposite sides of the second circuit board P2 and protrude from the bottom surface of the base B. Hence, the top portion F1 of the frame F can be used for circuit routing, thus facilitating miniaturization of the driving mechanism 100 and enhancing the structural strength of the frame F.

Figure 15:
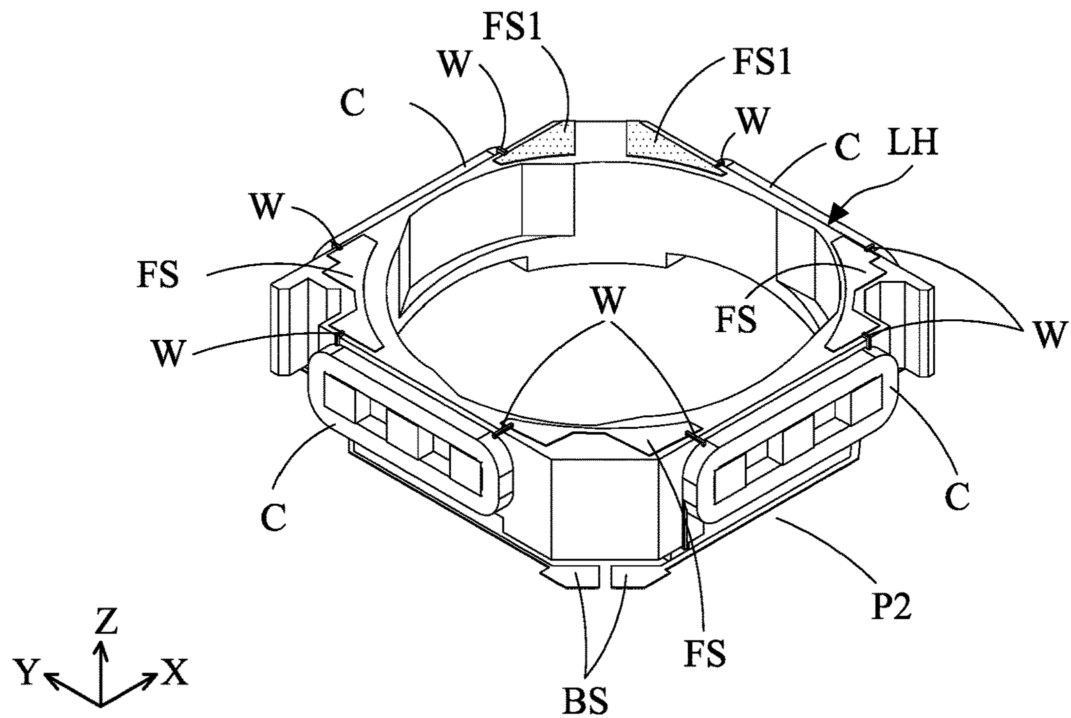
FIG. 15 is a perspective diagram showing several upper spring sheets FS and two metal sheets FS1 disposed on the top side of the holder LH.
Figure 16:
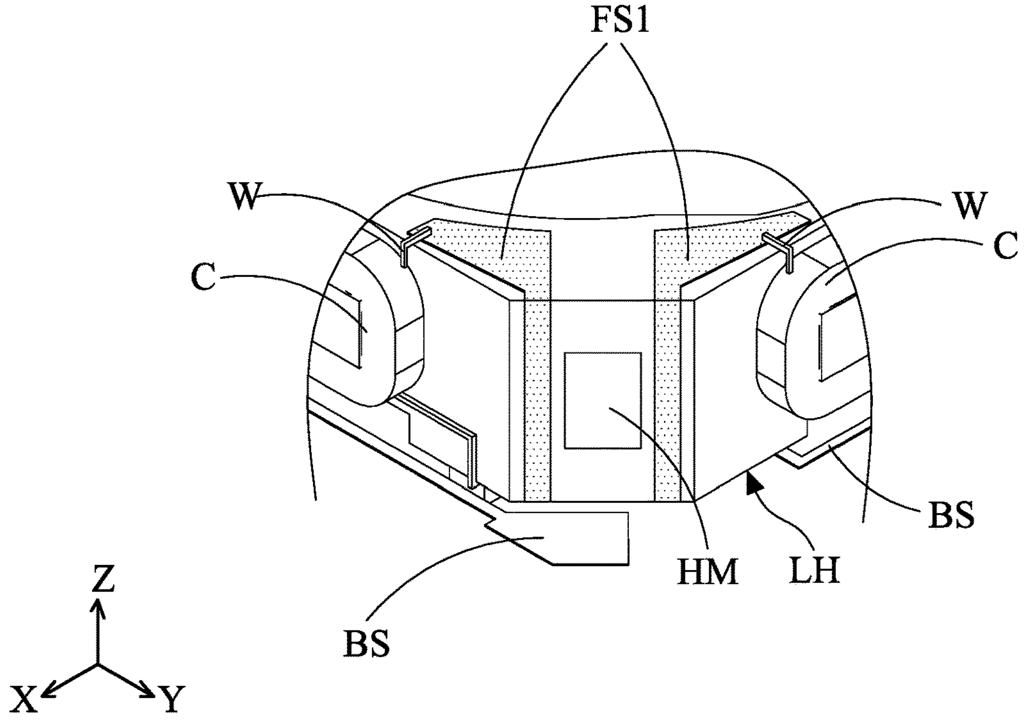
FIG. 16 is an enlarged perspective diagram showing the metal sheets FS1 extending from the top side to the bottom side of the holder LH.

FIG. 15 is a perspective diagram showing several upper spring sheets FS and two metal sheets FS1 disposed on the top side of the holder LH. FIG. 16 is an enlarged perspective diagram showing the metal sheets FS1 extending from the top side to the bottom side of the holder LH.

As shown in FIGS. 15 and 16, several upper spring sheets FS and two metal sheets FS1 are disposed on the top side of the holder LH, in accordance with another embodiment of the invention. The coils C on the holder LH can be electrically connected in serial by the upper spring sheets FS, the metal sheets FS1, and several wires W.

It should be noted that the upper spring sheets FS are disposed on three of the four short sides of the holder LH, whereby the coils C around the holder LH are electrically connected in serial. Referring to FIG. 16, two wires W adjacent to the other short side (corner) of the holder LH electrically connect the coils C to the metal sheets FS1, respectively. The two metal sheets FS1 are bent and extend from the top side of the holder LH to the spring sheets BS on the bottom side of the holder LH. The two metal sheets FS1 and the wires W do not extend horizontally across the short side (corner) of the holder LH in FIG. 16, and the magnet HM is disposed on the short side (corner) of the holder LH and located between the two metal sheets FS1.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:

a fixed part, having a base and a housing connected to each other;

a movable part, movably connected to the fixed part, wherein the optical element is disposed on the movable part and has an optical axis;

a driving assembly, configured to drive the movable part to move relative to the fixed part;

a frame affixed in the housing, having a top portion and a plurality of extending portions extending from the top portion toward the base, wherein the movable part is received in the frame, and when the movable part moves relative to the fixed part to a limit position along the optical axis, the movable part contacts the top portion of the frame to prevent from collision with the housing;

a first circuit board, disposed on the frame;

at least a first conductive member, embedded in the top portion of the frame;

a magnet, disposed on the movable part;

a magnetic field sensor, disposed on the first circuit board for detecting the position of the magnet;

a second circuit board, wherein the first and second circuit boards are disposed on opposite sides of the frame, and the first conductive member is electrically connected to the first and second circuit boards;

a temperature sensor, disposed on the second circuit board; and a plurality of first conductive members, extending downward on opposite sides of the second circuit board and protruding from the base.

2. The driving mechanism as claimed in claim 1, wherein the driving assembly includes a coil disposed on the movable part and a magnetic element disposed between the extending portions.

3. The driving mechanism as claimed in claim 1, wherein the temperature sensor faces the housing.

4. The driving mechanism as claimed in claim 1, wherein the magnetic field sensor and the temperature sensor face the same direction.

5. The driving mechanism as claimed in claim 1, wherein the driving assembly includes a coil and a magnetic element, and the frame is shaped in an octagon that includes a long side and a short side adjacent to each other, wherein the coil is disposed on the movable part, and the magnetic element is disposed on the long side of the frame.

6. The driving mechanism as claimed in claim 5, wherein the long side of the frame is 2 to 20 times of the short side.

7. The driving mechanism as claimed in claim 5, further comprising a rod affixed to the base and in contact with the movable part, wherein the movable part is slidable along the rod relative to the fixed part, and the rod is located adjacent to the short side of the frame and spaced away from the first circuit board.

8. The driving mechanism as claimed in claim 1, wherein the coil has a central axis offset from the optical axis in a horizontal direction that is perpendicular to the optical axis.

9. The driving mechanism as claimed in claim 1, further comprising a second conductive member embedded in the base and electrically connected to the first conductive member.

10. The driving mechanism as claimed in claim 1, further comprising a rod, wherein the base has a column affixed to the rod, and the rod contacts the movable part.

11. The driving mechanism as claimed in claim 10, further comprising a plurality of wires, wherein the driving assembly includes a plurality of coils and magnetic elements, the movable part has a plurality of bobbins, the wires connect the coils to the bobbins, and the column is higher than the bobbins on the top side of the movable part.

12. The driving mechanism as claimed in claim 11, wherein the movable part has a contact portion in contact with the rod, the column and the contact portion are located between two of the bobbins, and the contact portion is slidable along the rod.

13. The driving mechanism as claimed in claim 11, further comprising an upper spring sheet, wherein the coils are disposed on the movable part, and the magnetic elements are disposed on the frame, wherein the upper spring sheet is disposed on the top side of the movable part and electrically connected to the wires wound on the bobbins.

14. The driving mechanism as claimed in claim 1, wherein the housing has an opening, and the frame has a hole that is larger than the opening, wherein the optical axis passes through the opening and the hole.

15. A driving mechanism for moving an optical element, comprising:

a fixed part, having a base and a housing connected to each other;

a movable part, movably connected to the fixed part, wherein the optical element is disposed on the movable part and has an optical axis;

a driving assembly, configured to drive the movable part to move relative to the fixed part;

a frame, affixed in the housing, wherein the movable part is received in the frame, and when the movable part moves relative to the fixed part along the optical axis to a limit position, the movable part contacts the frame to prevent from collision with the housing; and a plurality of upper spring sheets, a lower spring sheet and a metal sheet, wherein the driving assembly includes a plurality of coils and magnetic elements, the coils are disposed on the movable part, the upper spring sheets are disposed on the top side of the movable part, the magnetic elements are disposed on the frame, and the coils are electrically connected by the upper spring sheets and the metal sheet, wherein the metal sheet extends from the top side of the movable part to the bottom side of the movable part to electrically connect to the lower spring sheet.

* * * * *